(12) United States Patent
Shen et al.

(10) Patent No.: US 11,902,986 B2
(45) Date of Patent: Feb. 13, 2024

(54) DATA TRANSMISSION METHOD, DEVICE AND SYSTEM

(71) Applicant: GUANGDONG OPPO MOBILE TELECOMMUNICATIONS CORP., LTD., Guangdong (CN)

(72) Inventors: Jia Shen, Guangdong (CN); Zhenshan Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 460 days.

(21) Appl. No.: 17/183,332

(22) Filed: Feb. 23, 2021

(65) Prior Publication Data

US 2021/0185715 A1    Jun. 17, 2021

Related U.S. Application Data

(63) Continuation of application No. PCT/CN2019/102603, filed on Aug. 26, 2019.

(60) Provisional application No. 62/722,812, filed on Aug. 24, 2018.

(51) Int. Cl.
| | |
|---|---|
| H04W 72/23 | (2023.01) |
| H04B 7/0413 | (2017.01) |
| H04L 1/1812 | (2023.01) |
| H04L 1/1867 | (2023.01) |
| H04W 72/044 | (2023.01) |

(52) U.S. Cl.
CPC ......... *H04W 72/23* (2023.01); *H04B 7/0413* (2013.01); *H04L 1/1812* (2013.01); *H04L 1/1887* (2013.01); *H04W 72/044* (2013.01)

(58) Field of Classification Search
None
See application file for complete search history.

(56) References Cited

U.S. PATENT DOCUMENTS

| | | | |
|---|---|---|---|
| 2013/0148637 A1* | 6/2013 | Yang | H04W 72/23 370/336 |
| 2016/0044737 A1 | 2/2016 | Kwon | |
| 2016/0278053 A1 | 9/2016 | Lee et al. | |
| 2017/0064725 A1 | 3/2017 | Yang et al. | |

(Continued)

FOREIGN PATENT DOCUMENTS

CN    106793090    5/2017

OTHER PUBLICATIONS

ZTE, "Discussion on NR Uu based resource allocation/configuration for LTE sidelink," 3GPP TSG RAN WG1 Meeting #94, R1-1808607, Aug. 2018.

(Continued)

*Primary Examiner* — Hong S Cho
(74) *Attorney, Agent, or Firm* — Hodgson Russ LLP

(57) ABSTRACT

Embodiments of the present disclosure provide a data transmission method, device and system. The method comprises: a network device transmits a first DCI and a second DCI to a first terminal and a second terminal, respectively. The first terminal transmits sidelink data on a time-frequency resource determined by the first sidelink scheduling information in the first DCI. And the second terminal receives the sidelink data on the time-frequency resource determined by the second sidelink scheduling information in the second DCI.

16 Claims, 4 Drawing Sheets

(56) References Cited

U.S. PATENT DOCUMENTS

2019/0029029 A1* 1/2019 Ohtsuji ................. H04W 4/023
2019/0208476 A1* 7/2019 Wu ..................... H04W 52/247

OTHER PUBLICATIONS

EPO, Extended European Search Report for EP Application No. 19852056.1, dated Oct. 4, 2021.
LG Electronics, "Discussion on eNB scheduling enhancement for sidelink resource allocation," 3GPP TSG RAN WG1 Meeting #84bis, R1-162481, Apr. 2016, 3 pages.
"3rd Generation Partnership Project; Technical Specification Group Services and System Aspects; Procedures for the 5G System; Stage 2 (Release 15)," 3GPP TS 23.502, Mar. 2018, v15.1.0, 285 pages.
WIPO, ISR and WO for PCT/CN2019/102603, dated Nov. 1, 2019.
EPO, Communication for EP Application No. 19852056.1, dated May 23, 2023.

* cited by examiner

DATA TRANSMISSION METHOD, DEVICE AND SYSTEM

CROSS-REFERENCE TO RELATED APPLICATION

The present disclosure is a continuation of International Application No. PCT/CN2019/102603, filed Aug. 26, 2019, which claims priority to U.S. Provisional Application No. 62/722,812, filed Aug. 24, 2018, the entire disclosures of which are incorporated herein by reference.

TECHNICAL FIELD

The present disclosure relates to the field of wireless communication technologies, and more particularly, to a data transmission method, device and system.

BACKGROUND

In legacy design in Long Term Evolution (LTE) Device to Device (D2D) and LTE Vehicle to X (V2X) specifications, sidelink has been specified for direct communication between User Equipments (UEs). Sidelink physical channels includes: Physical Sidelink Control Channel (PSCCH) and Physical Sidelink Shared Channel (PSSCH). PSSCH is used to carry data from a sending UE for sidelink communication, and PSCCH indicates resource and other transmission parameters used by a receiving UE for PSSCH. FIG. 1 schematically illustrates a system architecture according to current specifications. A sidelink resource for a sending UE can be scheduled by a base station. E.g. a specific downlink control information (DCI) format (e.g. DCI format 5) is used to schedule the sidelink resource for PSCCH and PSSCH to the sending UE on PDCCH (Physical Downlink Control Channel). The sending UE shall inform the scheduling information for PSSCH in PSCCH to a receiving UE, and transmit its sidelink data in PSSCH to the receiving UE based on the scheduling information.

However, in the above solution, the latency will be large because the sidelink scheduling information is transmitted in two steps. In the first step, the sidelink scheduling information is transmitted to the sending UE from the base station, and in the second step, the sidelink scheduling information is transmitted the receiving UE from the sending UE. This will substantially increase the transmission latency. Moreover, in some deployment scenarios, the channel condition between the two UEs is so poor that the PSCCH is not reliable for forwarding the scheduling information.

Thus, the above solution may not meet the latency and reliability requirements of 5G the Ultra-Reliable and Low-Latency Communication (URLLC) service. The URLLC service has strict requirements on reliability and transmission delay. For example, the URLLC service needs to achieve 99.999% reliability within 1 ms.

The above information disclosed in this Background section is only for enhancement of understanding of the background of the disclosure and therefore it may contain information that does not form the prior art that is already known in this country to a person of ordinary skill in the art.

SUMMARY

The present disclosure provides a transmission method, device and system.

In a first aspect, the present disclosure provides a data transmission method, which may comprise that a first terminal receives a first DCI from a network device, wherein the first DCI is configured to transport scheduling information of a sidelink between the first terminal and a second terminal; and the first terminal transmits sidelink data to the second terminal on a resource scheduled by the scheduling information; wherein the resource is obtained by the second terminal by receiving a second DCI from the network device and used by the second terminal for receiving the sidelink data.

In the second aspect, the present disclosure provides a data transmission method, which may comprise that a second terminal receives a second DCI from a network device, wherein the second DCI is configured to transport scheduling information of a sidelink between a first terminal and the second terminal; and the second terminal receives sidelink data from the first terminal on a resource scheduled by the scheduling information; wherein the resource is obtained by the first terminal by receiving a first DCI from the network device and used by the first terminal for transmitting the sidelink data.

In the third aspect, the present disclosure provides a data transmission method, which may comprise that a network device transmits a first DCI to a first terminal, wherein the first DCI is configured to transport scheduling information of a sidelink between the first terminal and a second terminal; and the network device transmits a second DCI to a second terminal, wherein the second DCI is also configured to transport scheduling information of the sidelink between the first terminal and the second terminal; wherein a resource scheduled by the scheduling information is used by the first terminal for transmitting sidelink data and by the second terminal for receiving the sidelink data.

In the fourth aspect, the present disclosure provides a terminal, which may comprise a receiver unit and a transmitter unit. Wherein the receiver unit is configured to receive a first DCI from a network device, and the first DCI is configured to transport scheduling information of a sidelink between the terminal and a second terminal; the transmitter unit is further configured to transmit sidelink data to the second terminal on a resource scheduled by the scheduling information; and the resource is obtained by the second terminal by receiving a second DCI from the network device and used by the second terminal for receiving the sidelink data.

In the fifth aspect, the present disclosure provides a terminal, which may comprise a receiver unit. Wherein the receiver unit is configured to receive a second DCI from a network device, and the second DCI is configured to transport scheduling information of a sidelink between a first terminal and the terminal; the receiver unit is further configured to receive sidelink data from the first terminal on a resource scheduled by the scheduling information; and the resource is obtained by the first terminal by receiving a first DCI from the network device and used by the first terminal for transmitting the sidelink data.

In the sixth aspect, the present disclosure provides a network device, which may comprise a transmitter unit. Wherein the transmitter unit is configured to transmit a first DCI to a first terminal, and the first DCI is configured to transport scheduling information of a sidelink between the first terminal and a second terminal; the transmit is further configured to transmit a second DCI to a second terminal, wherein the second DCI is also configured to transport scheduling information of the sidelink between the first terminal and the second terminal; and a resource scheduled by the scheduling information is used by the first terminal for transmitting sidelink data and by the second terminal for receiving the sidelink data.

In the seventh aspect, the present disclosure provides an end to end data transmission system, which may include the terminal of the fourth aspect, the terminal of the fifth aspect and the network device of the sixth aspect.

This section provides a summary of various implementations or examples of the technology described in the disclosure, and is not a comprehensive disclosure of the full scope or all features of the disclosed technology.

BRIEF DESCRIPTION OF THE DRAWINGS

To describe the technical solutions in the embodiments of the present disclosure more clearly, the following will briefly introduce the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
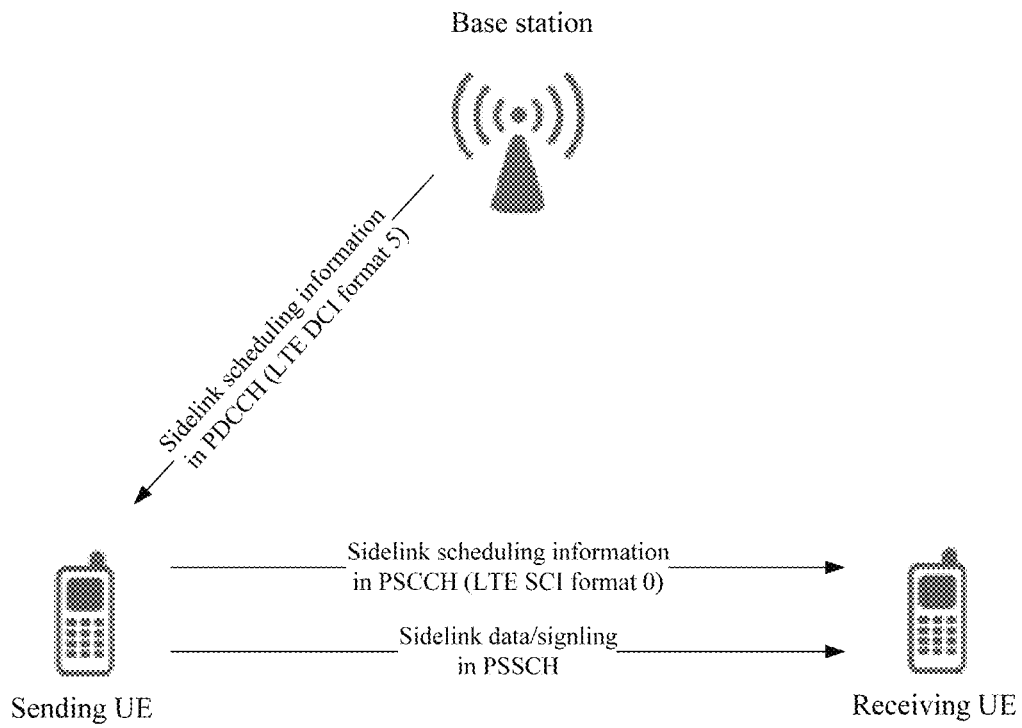
FIG. 1 schematically illustrates a system according to current specifications.

Exemplary embodiments of the disclosure will now be described more fully with reference to the accompanying drawings, in which exemplary embodiments are shown. Exemplary embodiments of the disclosure may, however, be embodied in many different forms and should not be construed as being limited to the embodiments set forth herein; rather, these embodiments are provided so that this disclosure will be thorough and complete, and will fully convey the concept of exemplary embodiments to those skilled in the art. In the drawings, the thicknesses of layers and regions are exaggerated for clarity. Like reference numerals in the drawings denote like elements, and thus their description will be omitted.

The described features, structures, or/and characteristics of the disclosure may be combined in any suitable manner in one or more embodiments. In the following description, numerous specific details are disclosed to provide a thorough understanding of embodiments of the disclosure. One skilled in the relevant art will recognize, however, that the disclosure may be practiced without one or more of the specific details, or with other methods, components and so forth. In other instances, well-known structures, materials, or operations are not shown or described in detail to avoid obscuring aspects of the disclosure.

In the present disclosure, terms such as "connected" and the like should be understood broadly, and may be directly connected or indirectly connected through an intermediate medium, unless otherwise specified. The specific meanings of the above terms in the present disclosure can be understood by those skilled in the art on a case-by-case basis.

Further, in the description of the present disclosure, the meaning of "a plurality" is at least two, for example, two, three, etc., unless specifically defined otherwise. "And/or", describing the association relationship of the associated objects, indicates that there may be three relationships, such as A and/or B, which may indicate that there are three cases of single A, single B and both A and B. The symbol "/" generally indicates that the contextual object is an "or" relationship. The terms "first" and "second" are used for descriptive purposes only and are not to be construed as indicating or implying a relative importance or implicitly indicating the number of technical features indicated. Thus, features defining "first" and "second" may include one or more of the features either explicitly or implicitly.

It is to be understood that the technical solutions of the present disclosure may be used in various wireless communication systems, for example, Global System of Mobile communication (GSM), General Packet Radio Service (GPRS), Wideband Code Division Multiple Access (WCDMA), High-Speed Packet Access (HSPA), LTE, LTE-Advanced (LTE-A), New Radio (NR) and so on. Furthermore, the communication between a terminal and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

It is to be understood that the term "terminal" refers to any end device that can access a wireless communication network and receive services therefrom. The terminal may include user equipment (UE), which is also referred to as a mobile terminal or mobile user equipment and so on. The user equipment may be a mobile terminal such as a mobile telephone (also referred to as a cellular telephone) or a computer having a mobile terminal such as portable, pocket, hand-held, vehicle-mounted mobile apparatuses or a mobile apparatus with a built-in computer.

It is to be understood that the term "network device" refers to a device in a wireless communication network via which a terminal accesses the network and receives services therefrom. The network device may include a base station (BS), an access point (AP), a Mobile Management Entity (MME), a Multi-cell/Multicast Coordination Entity (MCE), a Access and Mobility Management Function (AMF)/User Plane Function (UPF), a gateway, a server, a controller or any other suitable device in the wireless communication network. The BS may be, for example, a base transceiver station (BTS) in the GSM or the CDMA, or may be a Node B in the WCDMA, or may be an evolutional Node B (eNB or e-NodeB) in the LTE or the LTE-A, or may be a gNB in the NR, and the present disclosure is not limited thereto. However, for ease of description, reference is made in following embodiments taking the eNB as an example.

Figure 2:
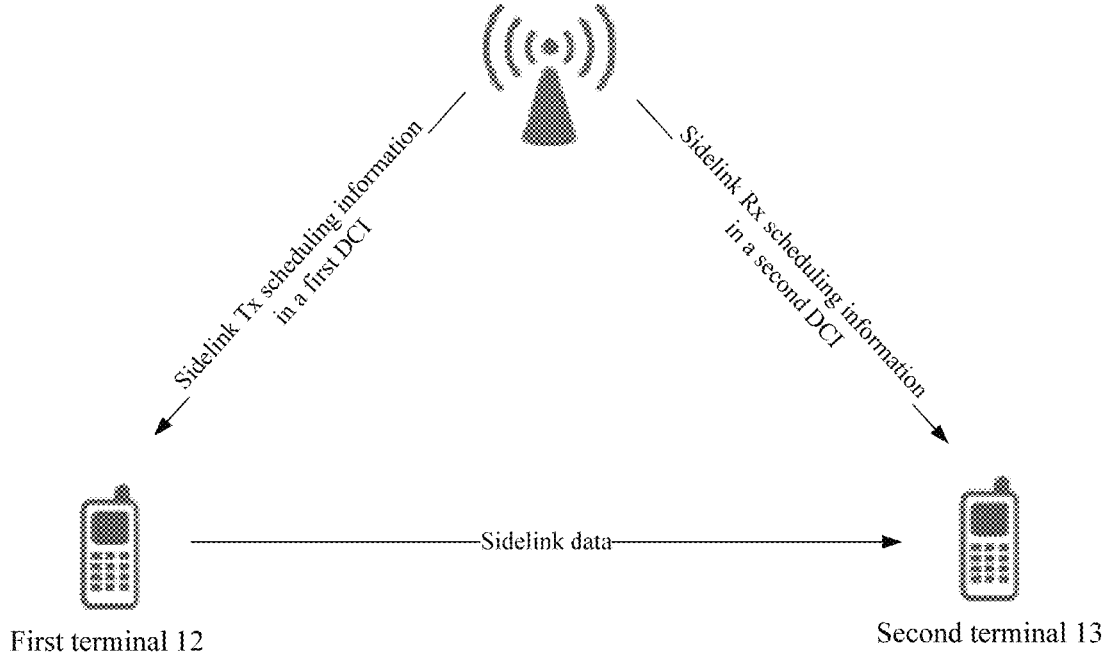
FIG. 2 schematically illustrates a data transmission system according to an embodiment of the present disclosure.

FIG. 2 schematically illustrates data transmission system architecture according to an embodiment of the present disclosure.

Referring to FIG. 2, the data transmission system 10 comprises: a network device 11, a first terminal 12 (which refers here to a sending terminal) and a second terminal 13 (which refers here to a receiving terminal). Communication between the network device 11 and the first terminal 12, as well as communication between the network device 11 and the second terminal 13, is implemented through a first-type air interface (e.g. a Uu Interface in cellular mobile communication). And communication between the first terminal 12 and the second terminal 13 is implemented through a second-type air interface (e.g. a sidelink air interface).

It can be understood that in the data transmission system 10, there may be multiple first terminals and second terminals. A first terminal and a second terminal are respectively shown in FIG. 2 only to exemplarily illustrate that a first terminal transmits data to a second terminal, instead of limiting the number of the first terminal and the second terminal.

The network device 11 may transmit a first DCI and a second DCI, for example on PDCCH, to the first terminal 12 and the second terminal 13, respectively.

The first terminal 12 monitors the first DCI and receives a first sidelink scheduling information in the first DCI and the second terminal 13 monitors the second DCI and receives a second sidelink scheduling information in the second DCI. And then the first terminal 12 transmits sidelink data on a first time-frequency resource (e.g. on PSSCH) determined by the first sidelink scheduling information in the first DCI. The second terminal 13 receives the sidelink data on a second time-frequency resource (e.g. on PSSCH) determined by the second sidelink scheduling in the second DCI. The first time-frequency resource and the second time-frequency are mapped to the same physical resource in the sidelink between the first terminal 12 and the second terminal 13.

It should be noted that the abovementioned sidelink data may include user data of the user plane, and may also include signaling or messages of the control plane.

In embodiments of the present disclosure, the first DCI and the second DCI may use the same DCI format (e.g. DCI format 5 defined for the scheduling of PSCCH). In order to distinguish the first DCI and the second DCI by a terminal (the first terminal 12 or the second terminal 13), the first DCI and the second DCI may include a field of identifier for DCI type to explicitly indicate different DCI types to the terminal. Therefore, the terminal can know whether the received DCI is used to schedule transmission resources or receive resources in the sidelink. For example, a first value of the identifier represents the first DCI and a second value of the identifier represents the second DCI.

In an alternative embodiment, the first DCI and the second DCI may use the different DCI format (e.g. new DCI format 5A and DCI format 5B) to indicate different DCI types to the terminal.

The first DCI may be with CRC scrambled by RNTI (Radio Network Temporary Identifier) of the first terminal 12. And the second DCI may be with CRC scrambled by RNTI of the second terminal 13.

In embodiments of the present disclosure, the first terminal 12 and the second terminal 13 may receive synchronization signals sent by each other. Optionally, the first terminal 12 and the second terminal 13 may send the synchronization signals to each other by broadcast, so that other second terminals 13 communicating with the first terminal 12 through the sidelink may receive the synchronization signals sent by the first terminals.

Wherein, the synchronization signal may include clock information (a transmit clock) and identity (ID) information. Therefore, when receiving the synchronization signals sent by each other, the first terminal 12 and the second terminal 13 may obtain the clock information and ID information of each other, and then the first terminal 12 and the second terminal 13 may complete synchronization. A synchronization process may refer to descriptions about synchronization in a conventional art and will not be elaborated in the embodiment of the disclosure.

In embodiments of the present disclosure, the first terminal 12 and the second terminal 13 may receive broadcast channels sent by the other. The first terminal 12 and the second terminal 13 may receive the broadcast channels of each other to determine transmission bandwidths of each other and determine whether they are within coverage of the network device 11 or not.

In embodiments of the present disclosure, the network device 11 may receive a resource request for the sidelink data transmission sent by the first terminal 12 before transmitting the first DCI and the second DCI to the first terminal 12 and the second terminal 13, respectively. The resource request for the sidelink data transmission may be a scheduling request (SR) or a buffer status report (BSR).

In embodiments of the present disclosure, the network device 11 may also receive sidelink channel state information (CSI) from the second terminal 13 to feedback the channel quality information in sidelink before transmitting the first DCI and the second DCI to the first terminal 12 and the second terminal 13, respectively.

The first sidelink scheduling information and/or the second sidelink scheduling information may include a field of frequency domain resource assignment and a field of time domain resource assignment. For the first DCI, the fields of frequency domain resource assignment and time domain resource assignment are configured to indicate, respectively, the frequency resource and the time resource in the sidelink allocated to the first terminal 12 for the sidelink transmission. And for the second DCI, the fields of frequency domain resource assignment and time domain resource assignment are configured to indicate, respectively, the frequency-domain resource and the time-domain resource in the sidelink allocated to the second terminal 13 for the sidelink reception.

In an alternative embodiment of the present disclosure, the first sidelink scheduling information and/or the second sidelink scheduling information may only include a field of frequency domain resource assignment or a field of time domain resource assignment. For example, if the time domain resource used for sidelink transmission is pre-configured, only a field of frequency domain resource assignment is present; conversely, if the frequency domain resource used for the sidelink transmission is pre-configured, only a field of time domain resource assignment is present.

In an alternative embodiment of the present disclosure, the first sidelink scheduling information and/or the second sidelink scheduling information may include a field of resource block assignment to indicate the time-frequency domain resource in the sidelink. The field of resource block assignment is configured to indicate the resource block in the sidelink for the sidelink transmission or reception. In the sidelink, for example, a physical resource block may be defined as $N_{symb}^{SL}$ consecutive SC-FDMA symbols in the time domain and $N_{sc}^{RB}$ consecutive subcarriers in the frequency domain. A physical resource block in the sidelink thus consists of $N_{symb}^{SL} \times N_{sc}^{RB}$ resource elements, corresponding to one slot in the time domain and 180 kHz in the frequency domain.

It is noted that the frequency-domain resource for the sidelink transmission and reception shall be determined by the first terminal's active bandwidth part for sidelink transmission and the second terminal's active bandwidth part for sidelink reception. Similarly, the time-domain resource for the sidelink transmission and reception shall be based on the time-domain resource set/table configured to the first terminal 12 and the time-domain resource set/table configured to the second terminal 13.

The first DCI and the second DCI may further include a field of modulation and coding scheme. This field is configured to indicate the modulation and coding scheme of the sidelink data transmitted in the sidelink. The first terminal encodes and modulates the sidelink data to be sent by using the modulation and coding scheme, and the second terminal uses the modulation and coding scheme to demodulate and decode the received sidelink data. It should be noted that if the MSC is pre-configured, the field of modulation and coding scheme would be not present in the first DCI and the second DCI.

In embodiments of the present disclosure, the first DCI and the second DCI may further include a field of carrier indicator. It should be understood that this field is included in the DCI only when both the first terminal 12 and the second terminal 13 support multiple carriers or carrier aggregation. this field indicates the component carrier index of the frequency-domain resource for the sidelink transmission and reception. That is, the first terminal 12 transmits the sidelink data on the carrier indicated by the first DCI, and the second terminal receives the sidelink data on the carrier indicated by the second DCI.

In embodiments of the present disclosure, the first DCI and the second DCI may further include a field of redundancy version. For the first DCI, the field of redundancy version is configured to indicate the redundancy version of the sidelink data for the first terminal transmission; and for the second DCI, the field of redundancy version is configured to indicate the redundancy version of the sidelink data for the second terminal reception.

In embodiments of the present disclosure, the first DCI and the second DCI may further include a field of HARQ (Hybrid Automatic Repeat Request) process number. For the first DCI, the field of HARQ process number is configured to indicate the HARQ process number of the sidelink data for the first terminal transmission; and for the second DCI, the field of HARQ process number is configured to indicate the HARQ process number of the sidelink data for the second terminal reception.

In embodiments of the present disclosure, the second DCI may further include a field of HARQ timing indicator. This field is only present in the second DCI, which indicates to the second terminal 13 the timing for transmit HARQ-ACK/NACK for the received sidelink data.

A HARQ-ACK or HARQ-NACK is transmitted by the second terminal 13 after receiving the data transmitted by the first terminal 12. The HARQ-ACK or HARQ-NACK may be transmitted to the network device 11 or to the first terminal 12. If the HARQ-NACK of the sidelink data is transmitted to the network device 11, the network device 11 can directly transmit the retransmission resource of the sidelink through the first DCI and the second DCI to the first terminal 12 and the second terminal 13. And if the HARQ-NACK of the sidelink data is transmitted to the first terminal 12, the first terminal has to transmit retransmission resource request for retransmitting the sidelink data, which will cause more retransmission delays.

In embodiments of the present disclosure, the first DCI may further include a field of TPC (transmission power control command). This field is only present in the first DCI, which indicates to the first terminal 12 to adjust transmission power of the sidelink data.

In embodiments of the present disclosure, the first DCI may further include a field of CSI-RS (channel state information reference signal) resource indicator. This field is only present in the first DCI, which indicates to the first terminal 12 the resource for transmitting CSI-RS to the second terminal 13.

In embodiments of the present disclosure, the second DCI may further include a field of SRS (sounding reference signal) resource indicator. This field is only present in the second DCI, which indicates to the second terminal 13 the resource for transmitting SRS to the first terminal 12.

In embodiments of the present disclosure, the first DCI and the second DCI may further include a field of PUCCH resource indicator. For the first DCI, the PUCCH resource indicator is configured to indicate first PUCCH resource for transmitting a first uplink control information (UCI) corresponding to the sidelink data to the network device 11 by the first terminal 12. And for the second DCI, the PUCCH resource indicator is configured to indicate second PUCCH resource for transmitting second UCI corresponding to the sidelink data to the network device 11 by the second terminal 12.

The first UCI may comprise at least one of scheduling request, buffer status report, service type or QoS requirement. And the second UCI comprises at least one of HARQ-ACK/NACK for the received sidelink data, the sidelink channel state information report.

The first PUCCH resource may be based on PUCCH resource set configured for the first terminal 12. And the second PUCCH resource may be based on PUCCH resource set configured for the second terminal.

In embodiments of the present disclosure, the first DCI and the second DCI may further include a field of frequency hopping flag and a field of frequency hopping parameters/configurations. The frequency hopping flag is configured to indicate to the first terminal 12 and the second terminal 13 whether the first terminal 12 shall perform PSSCH frequency hopping or not, and the frequency hopping parameters/configurations are configured to indicate to the first terminal 12 and the second terminal 13 the frequency hopping parameters/configurations for the sidelink data if the frequency hopping flag indicates that the first terminal 12 shall perform PSSCH frequency hopping.

In embodiments of the present disclosure, the first DCI and the second DCI may further include a field of sidelink MIMO transmission parameters/configurations. This field of the sidelink MIMO transmission parameters/configurations is configured to indicate to the first terminal 12 and the second terminal 13 the sidelink MIMO transmission parameters/configurations for the sidelink data.

In embodiments of the present disclosure, the first DCI may further include a field of timing advance indication. This field is only present in the first DCI, which is configured to indicate to the first terminal 12 the timing advance for transmitting the sidelink data.

In embodiments of the present disclosure, the second DCI may further include a field of group destination ID. This field is only present in the second DCI, which is configured to indicate to the second terminal 13 the group destination ID for the sidelink data.

Figure 3:
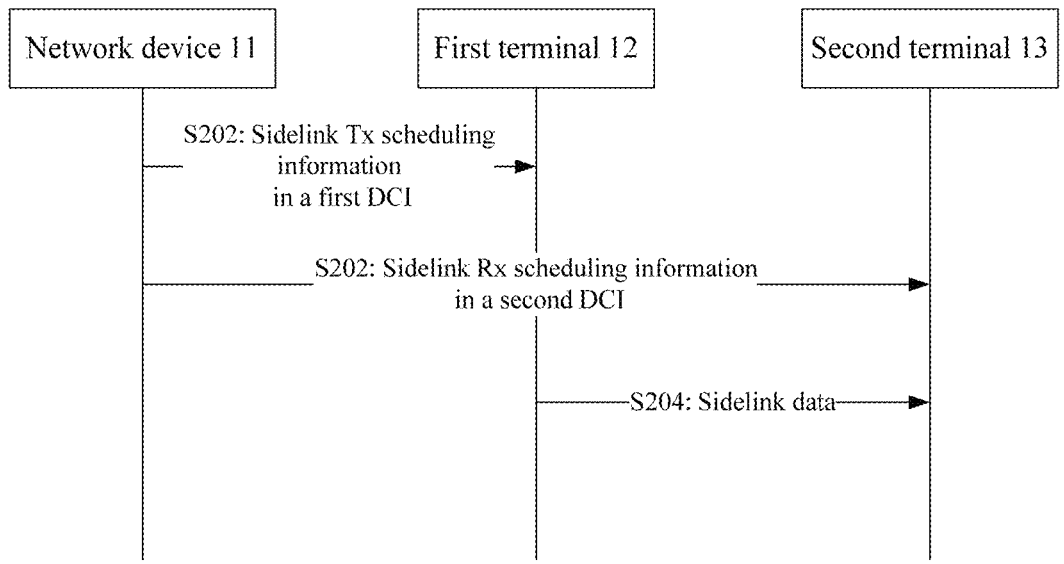
FIG. 3 schematically illustrates a flowchart of a data transmission method according to an embodiment of the present disclosure.

FIG. 3 schematically illustrates a flowchart of a data transmission method according to an embodiment of the present disclosure. The method may be applied, for example, to the data transmission system 10 in FIG. 2.

Referring to FIG. 3, the method 20 comprises:

In Step S202, the network device 11 transmits a first DCI and a second DCI to the first terminal 12 and the second terminal 13, respectively.

In embodiments of the present disclosure, before Step S202, the first terminal 12 and the second terminal 13 may receive synchronization signals sent by each other. Optionally, the first terminal 12 and the second terminal 13 may send the synchronization signals to each other by broadcast, so that other second terminals 13 communicating with the first terminal 12 through the sidelink may receive the synchronization signals sent by the first terminals.

Wherein, the synchronization signal may include clock information (a transmit clock) and identity (ID) information. Therefore, when receiving the synchronization signals sent by each other, the first terminal 12 and the second terminal 13 may obtain the clock information and ID information of each other, and then the first terminal 12 and the second terminal 13 may complete synchronization. A synchronization process may refer to descriptions about synchronization in a conventional art and will not be elaborated in the embodiment of the disclosure.

In embodiments of the present disclosure, before Step S202, the first terminal 12 and the second terminal 13 may receive broadcast channels sent by the other. The first terminal 12 and the second terminal 13 may receive the broadcast channels of each other to determine transmission bandwidths of each other and determine whether they are within coverage of the network device 11 or not.

In embodiments of the present disclosure, the network device 11 may receive a resource request for the sidelink data transmission sent by the first terminal 12 before Step S202. The resource request for the sidelink data transmission may be a scheduling request (SR) or a buffer status report (BSR).

In embodiments of the present disclosure, the network device 11 may also receive sidelink channel state information (CSI) from the second terminal 13 to feedback the channel quality information in sidelink before Step S202.

The first terminal 12 monitors the first DCI and receives a first sidelink scheduling information in the first DCI.

The first DCI may be with CRC scrambled by RNTI of the first terminal 12.

The second terminal 13 monitors the second DCI and receives a second sidelink scheduling information in the second DCI.

The second DCI may be with CRC scrambled by RNTI of the second terminal 13.

In embodiments of the present disclosure, the first DCI and the second DCI may use the same DCI format (e.g. DCI format 5 defined for the scheduling of PSCCH). In order to distinguish the first DCI and the second DCI by a terminal (the first terminal 12 or the second terminal 13), the first DCI and the second DCI may include a field of identifier for DCI type to explicitly indicate different DCI types to the terminal. Therefore, the terminal can know whether the received DCI is used to schedule transmission resources or receive resources in the sidelink. For example, a first value of the identifier represents the first DCI and a second value of the identifier represents the second DCI.

In an alternative embodiment, the first DCI and the second DCI may use the different DCI format (e.g. new DCI format 5A and DCI format 5B) to indicate different DCI types to the terminal.

The details of the first DCI and the second DCI have been explained above, and will not be described again here.

In Step S204, the first terminal 12 transmits sidelink data on a first time-frequency resource determined by the first sidelink scheduling information in the first DCI.

The second terminal 13 receives the sidelink data on a second time-frequency resource determined by the second sidelink scheduling in the second DCI. The first time-frequency resource and the second time-frequency are mapped to the same physical resource in the sidelink between the first terminal 12 and the second terminal 13.

It should be noted that the abovementioned sidelink data may include user data of the user plane, and may also include signaling or messages of the control plane.

According to the data transmission method of the embodiment of the disclosure, the network device may transmit the first DCI to the first terminal and the second DCI to the second terminal at the same time. In addition, separate DCIs are defined for the sidelink transmission and reception respectively, so that the first terminal and the second terminal can obtain the scheduling information at the same time. Thus the transmission latency can be substantially reduced. And the scheduling information for the second terminal is transmitted by the network device, which can substantially improve the reliability of the scheduling information transmission. Therefore, the spectral efficiency and robustness of the sidelink communication system can be substantially enhanced.

Figure 4:
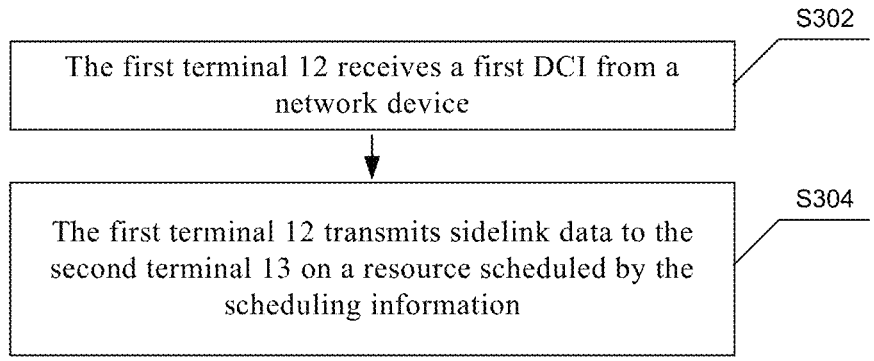
FIG. 4 schematically illustrates a flowchart of a data transmission method according to another embodiment of the present disclosure.

FIG. 4 schematically illustrates a flowchart of a data transmission method according to another embodiment of the present disclosure. The method may be applied, for example, to the first terminal 12 in FIG. 2.

Referring to FIG. 4, the method 30 comprises:

In Step S302, the first terminal 12 receives a first DCI from a network device (e.g. the network device 11 in FIG. 2).

Wherein, the first DCI is configured to transport scheduling information of the sidelink between the first terminal 12 and a second terminal (e.g. the second terminal 13 in FIG. 2)

The first DCI may comprise: frequency domain resource assignment, time domain resource assignment and modulation and coding scheme.

In embodiments of the present disclosure, before Step S302, the first terminal 12 and the second terminal 13 may receive synchronization signals sent by each other. Optionally, the first terminal 12 and the second terminal 13 may send the synchronization signals to each other by broadcast, so that other second terminals 13 communicating with the first terminal 12 through the sidelink may receive the synchronization signals sent by the first terminals.

Wherein, the synchronization signal may include clock information (a transmit clock) and identity (ID) information. Therefore, when receiving the synchronization signals sent by each other, the first terminal 12 and the second terminal 13 may obtain the clock information and ID information of each other, and then the first terminal 12 and the second terminal 13 may complete synchronization. A synchronization process may refer to descriptions about synchronization in a conventional art and will not be elaborated in the embodiment of the disclosure.

In embodiments of the present disclosure, before Step S302, the first terminal 12 and the second terminal 13 may receive broadcast channels sent by the other. The first terminal 12 and the second terminal 13 may receive the broadcast channels of each other to determine transmission bandwidths of each other and determine whether they are within coverage of the network device 11 or not.

In embodiments of the present disclosure, the network device 11 may receive a resource request for the sidelink data transmission sent by the first terminal 12 before Step S302. The resource request for the sidelink data transmission may be a scheduling request (SR) or a buffer status report (BSR).

In embodiments of the present disclosure, the network device 11 may also receive sidelink channel state information (CSI) from the second terminal 13 to feedback the channel quality information in sidelink before Step S302.

The first terminal 12 monitors the first DCI and receives a first sidelink scheduling information in the first DCI.

The first DCI may be with CRC scrambled by RNTI of the first terminal 12.

The details of the first DCI have been explained above, and will not be described again here.

In Step S304, the first terminal 12 transmits sidelink data to the second terminal 13 on a resource scheduled by the scheduling information.

The resource may be determined according to the frequency domain resource assignment and the time domain resource assignment by using the modulation and coding scheme.

Wherein, the resource is obtained by the second terminal 13 by receiving a second DCI from the network device 11, and the resource is used by the second terminal for receiving the sidelink data.

The second DCI may comprise: the frequency domain resource assignment, the time domain resource assignment and the modulation and coding scheme.

According to the data transmission method of the embodiment of the disclosure, the network device may transmit the first DCI to the first terminal and the second DCI to the second terminal at the same time. In addition, separate DCIs are defined for the sidelink transmission and reception respectively, so that the first terminal and the second terminal can obtain the scheduling information at the same time. Thus the transmission latency can be substantially reduced. And the scheduling information for the second terminal is transmitted by the network device, which can substantially improve the reliability of the scheduling information transmission. Therefore, the spectral efficiency and robustness of the sidelink communication system can be substantially enhanced.

Figure 5:
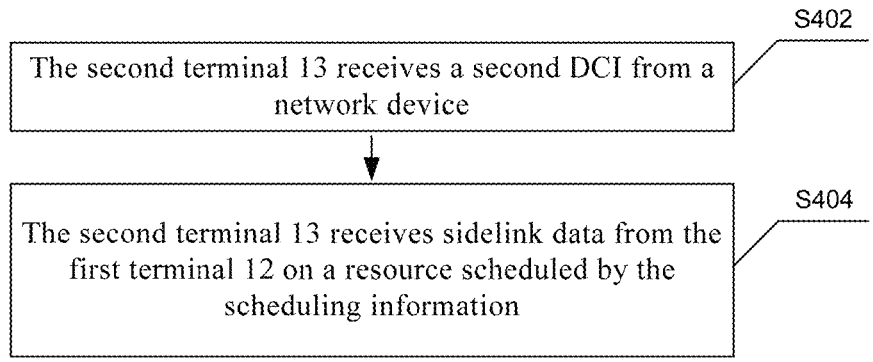
FIG. 5 schematically illustrates a flowchart of a data transmission method according to another embodiment of the present disclosure.

FIG. 5 schematically illustrates a flowchart of a data transmission method according to another embodiment of the present disclosure. The method may be applied, for example, to the second terminal 13 in FIG. 2.

Referring to FIG. 5, the method 40 comprises:

In Step S402, the second terminal 13 receives a second DCI from a network device (e.g. the network device 11 in FIG. 2).

Wherein, the second DCI is configured to transport scheduling information of a sidelink between a first terminal (e.g. the first terminal 12 in FIG. 2) and the second terminal 13 and comprises: frequency domain resource assignment, time domain resource assignment and modulation and coding scheme In embodiments of the present disclosure, before Step S402, the first terminal 12 and the second terminal 13 may receive synchronization signals sent by each other. Optionally, the first terminal 12 and the second terminal 13 may send the synchronization signals to each other by broadcast, so that other second terminals 13 communicating with the first terminal 12 through the sidelink may receive the synchronization signals sent by the first terminals.

Wherein, the synchronization signal may include clock information (a transmit clock) and identity (ID) information. Therefore, when receiving the synchronization signals sent by each other, the first terminal 12 and the second terminal 13 may obtain the clock information and ID information of each other, and then the first terminal 12 and the second terminal 13 may complete synchronization. A synchronization process may refer to descriptions about synchronization in a conventional art and will not be elaborated in the embodiment of the disclosure.

In embodiments of the present disclosure, before Step S402, the first terminal 12 and the second terminal 13 may receive broadcast channels sent by the other. The first terminal 12 and the second terminal 13 may receive the broadcast channels of each other to determine transmission bandwidths of each other and determine whether they are within coverage of the network device 11 or not.

In embodiments of the present disclosure, the network device 11 may receive a resource request for the sidelink data transmission sent by the first terminal 12 before Step S402. The resource request for the sidelink data transmission may be a scheduling request (SR) or a buffer status report (BSR).

In embodiments of the present disclosure, the network device 11 may also receive sidelink channel state information (CSI) from the second terminal 13 to feedback the channel quality information in sidelink before Step S402.

The second terminal 13 monitors the second DCI and receives a second sidelink scheduling information in the second DCI.

The second DCI may be with CRC scrambled by RNTI of the second terminal 13.

The details of the second DCI have been explained above, and will not be described again here.

In Step S404, the second terminal 13 receives sidelink data from the first terminal 12 on a resource scheduled by the scheduling information.

The resource may be determined according to the frequency domain resource assignment and the time domain resource assignment.

Wherein, the resource is obtained by the first terminal 12 by receiving a first DCI from the network device 11 and used by the first terminal for transmitting the sidelink data.

The first DCI may comprise: the frequency domain resource assignment, the time domain resource assignment and the modulation and coding scheme.

According to the data transmission method of the embodiment of the disclosure, the network device may transmit the first DCI to the first terminal and the second DCI to the second terminal at the same time. In addition, separate DCIs are defined for the sidelink transmission and reception respectively, so that the first terminal and the second terminal can obtain the scheduling information at the same time. Thus the transmission latency can be substantially reduced. And the scheduling information for the second terminal is transmitted by the network device, which can substantially improve the reliability of the scheduling information transmission. Therefore, the spectral efficiency and robustness of the sidelink communication system can be substantially enhanced.

Figure 6:
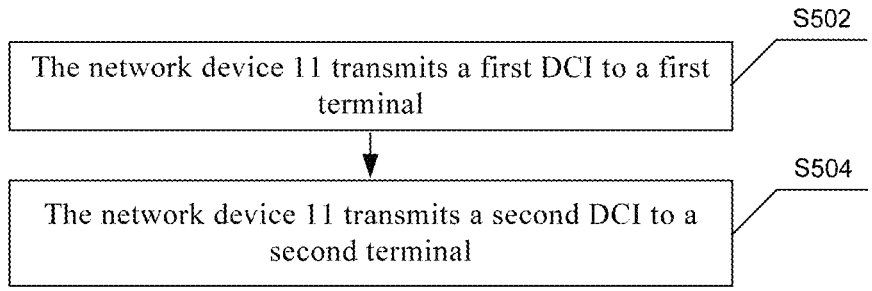
FIG. 6 schematically illustrates a flowchart of a data transmission method according to another embodiment of the present disclosure.

FIG. 6 schematically illustrates a flowchart of a data transmission method according to another embodiment of the present disclosure. The method may be applied, for example, to the network device 11 in FIG. 2.

Referring to FIG. 6, the method 50 comprises:

In Step S502, the network device 11 transmits a first DCI to a first terminal (e.g. the first terminal 12 in FIG. 2).

Wherein, the first DCI is configured to transport scheduling information of a sidelink between the first terminal 12 and a second terminal 13.

In Step S504, the network device 11 transmits a second DCI to a second terminal (e.g. the second terminal 13 in FIG. 2).

Wherein, the second DCI is also configured to transport scheduling information of the sidelink between the first terminal 12 and the second terminal 13. The first DCI and the second DCI comprises: frequency domain resource assignment, time domain resource assignment and modulation and coding scheme; for the first DCI, the frequency domain resource assignment and the time domain resource assignment is configured to indicate time-frequency resource for the sidelink data transmission; and for the second DCI, the frequency domain resource assignment and the time domain resource assignment is configured to indicate the time-frequency resource for the sidelink data reception.

In embodiments of the present disclosure, before Step S502, the first terminal 12 and the second terminal 13 may receive synchronization signals sent by each other. Optionally, the first terminal 12 and the second terminal 13 may send the synchronization signals to each other by broadcast, so that other second terminals 13 communicating with the first terminal 12 through the sidelink may receive the synchronization signals sent by the first terminals.

Wherein, the synchronization signal may include clock information (a transmit clock) and identity (ID) information. Therefore, when receiving the synchronization signals sent by each other, the first terminal 12 and the second terminal 13 may obtain the clock information and ID information of each other, and then the first terminal 12 and the second terminal 13 may complete synchronization. A synchronization process may refer to descriptions about synchronization in a conventional art and will not be elaborated in the embodiment of the disclosure.

In embodiments of the present disclosure, before Step S502, the first terminal 12 and the second terminal 13 may receive broadcast channels sent by the other. The first terminal 12 and the second terminal 13 may receive the broadcast channels of each other to determine transmission bandwidths of each other and determine whether they are within coverage of the network device 11 or not.

In embodiments of the present disclosure, the network device 11 may receive a resource request for the sidelink data transmission sent by the first terminal 12 before Step S502. The resource request for the sidelink data transmission may be a scheduling request (SR) or a buffer status report (BSR).

In embodiments of the present disclosure, the network device 11 may also receive sidelink channel state information (CSI) from the second terminal 13 to feedback the channel quality information in sidelink before Step S502.

In embodiments of the present disclosure, the first DCI and the second DCI may use the same DCI format (e.g. DCI format 5 defined for the scheduling of PSCCH). In order to distinguish the first DCI and the second DCI by a terminal (the first terminal 12 or the second terminal 13), the first DCI and the second DCI may include a field of identifier for DCI type to explicitly indicate different DCI types to the terminal. Therefore, the terminal can know whether the received DCI is used to schedule transmission resources or receive resources in the sidelink. For example, a first value of the identifier represents the first DCI and a second value of the identifier represents the second DCI.

In an alternative embodiment, the first DCI and the second DCI may use the different DCI format (e.g. new DCI format 5A and DCI format 5B) to indicate different DCI types to the terminal.

The first DCI may be with CRC scrambled by RNTI (Radio Network Temporary Identifier) of the first terminal 12. And the second DCI may be with CRC scrambled by RNTI of the second terminal 13.

According to the data transmission method of the embodiment of the disclosure, the network device may transmit the first DCI to the first terminal and the second DCI to the second terminal at the same time. In addition, separate DCIs are defined for the sidelink transmission and reception respectively, so that the first terminal and the second terminal can obtain the scheduling information at the same time. Thus the transmission latency can be substantially reduced. And the scheduling information for the second terminal is transmitted by the network device, which can substantially improve the reliability of the scheduling information transmission. Therefore, the spectral efficiency and robustness of the sidelink communication system can be substantially enhanced.

The following is embodiments of the device of the present disclosure, which can be used to carry out the method embodiments of the present disclosure. For details not disclosed in the embodiment of the device of the present disclosure, please refer to the method embodiments of the present disclosure.

Figure 7:
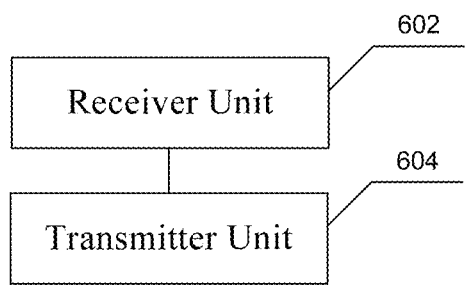
FIG. 7 schematically illustrates a terminal according to an embodiment of the present disclosure.

FIG. 7 schematically illustrates a terminal according to an embodiment of the present disclosure. The terminal may be the first terminal 12 in FIG. 2.

Referring to FIG. 7, the terminal 60 comprises: a receiver unit 602 and a transmitter unit 604.

The receiver unit 602 is configured to receive a first DCI from a network device (e.g. the network device 11 in FIG. 2), wherein the first DCI is configured to transport scheduling information of a sidelink between the terminal 60 and a second terminal (e.g. the second terminal 13 in FIG. 3) and may comprise: frequency domain resource assignment, time domain resource assignment and modulation and coding scheme.

The transmitter unit 604 is configured to transmit sidelink data to the second terminal on a resource scheduled by the scheduling information. For example, the resource may be determined according to the frequency domain resource assignment and the time domain resource assignment by using the modulation and coding scheme.

Wherein the resource is obtained by the second terminal by receiving a second DCI from the network device and used by the second terminal for receiving the sidelink data.

The second DCI may comprise: the frequency domain resource assignment, the time domain resource assignment and the modulation and coding scheme.

In embodiments of the present disclosure, the first DCI and the second DCI further comprises: redundancy version and HARQ process number; for the first DCI, the redundancy version is configured to indicate the redundancy version of the sidelink data for the terminal 60 transmission and the HARQ process number is configured to indicate the HARQ process number of the sidelink data for the terminal 60 transmission; for the second DCI, the redundancy version is configured to indicate the redundancy version of the sidelink data for the second terminal reception and the HARQ process number is configured to indicate the HARQ process number of the sidelink data for the second terminal reception.

In embodiments of the present disclosure, the first DCI and the second DCI further comprises: PUCCH resource indicator; for the first DCI, the PUCCH resource indicator is configured to indicate first PUCCH resource for transmitting a first UCI corresponding to the sidelink data to the network device by the terminal 60; for the second DCI, the PUCCH resource indicator is configured to indicate second PUCCH resource for transmitting second UCI corresponding to the sidelink data to the network device by the second terminal.

In embodiments of the present disclosure, the first UCI comprises at least one of scheduling request, buffer status report, service type or QoS requirement.

In embodiments of the present disclosure, the first PUCCH resource is based on PUCCH resource set configured for the terminal 60.

In embodiments of the present disclosure, the first DCI and the second DCI further comprises: frequency hopping flag and frequency hopping parameters/configurations; the frequency hopping flag is configured to indicate to the terminal 60 and the second terminal whether the terminal 60 shall perform PSSCH frequency hopping or not, and the frequency hopping parameters/configurations are configured to indicate to the terminal 60 and the second terminal the frequency hopping parameters/configurations for the sidelink data if the frequency hopping flag indicates that the terminal 60 shall perform PSSCH frequency hopping.

In embodiments of the present disclosure, the first DCI and the second DCI further comprises at least one of carrier indicator, sidelink MIMO transmission parameters/configurations or identifier for DCI; for first DCI, the carrier indicator is configured to indicate a component carrier index of the terminal 60; and for the second DCI, the carrier indicator is configured to indicate a component carrier index of the second terminal; the sidelink MIMO transmission parameters/configurations are configured to indicate to the terminal 60 and the second terminal the sidelink MIMO transmission parameters/configurations for the sidelink data; and the identifier for DCI is configured to indicate to the terminal 60 and the second terminal the received DCI is the first DCI or the second DCI.

In embodiments of the present disclosure, the first DCI further comprises at least one of TPC command, CSI-RS resource indicator or timing advance indication; the TPC command is configured to adjust transmission power of the sidelink data for the terminal 60, the CSI-RS resource indicator is configured to indicate the terminal 60 resource for transmitting CSI-RS to the second terminal, and the timing advance indication is configured to indicate to the terminal 60 the timing advance for transmitting the sidelink data.

It is important to note that, in the embodiment of the disclosure, the receiver unit 602 may be implemented by a receiver (e.g. the receiver 1004 in FIG. 10) and the transmitter unit 604 may be implemented by a transmitter (e.g. the transmitter 1006).

Figure 10:
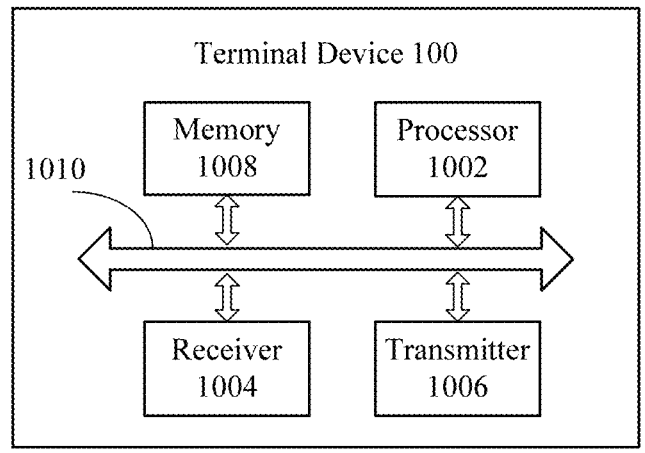
FIG. 10 schematically illustrates a terminal device according to an embodiment of the present disclosure.

FIG. 10 schematically illustrates a terminal device according to an embodiment of the present disclosure.

As illustrated in FIG. 10, a terminal device 100 may include a processor 1002, a receiver 1004, a transmitter 1006 and a memory 1008, wherein the memory 1008 may be configured to store a code executed by the processor 1002 an the like.

Each component in the terminal device 100 is coupled together through a bus system 1010, wherein the bus system 1010 includes a data bus, and further includes a power bus, a control bus and a state signal bus.

The processor 1002 typically controls overall operations of the terminal device 100, such as the operations associated with display, data communications and recording operations. The processor 1002 may include one or more processors to execute instructions to perform all or part of the steps in the above described methods. Moreover, the processor 1002 may include one or more modules which facilitate the interaction between the processor 1002 and other components.

The memory 1008 is configured to store various types of data to support the operation of the terminal device 100. Examples of such data include instructions for any applications or methods operated on the terminal device 100, contact data, phonebook data, messages, pictures, video, etc. The memory 1008 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory or a magnetic or optical disk.

The receiver 1004 is configured to receive an electromagnetic signal received by the antenna. The main function of the receiver is to select the frequency components it needs from the numerous electromagnetic waves existing in the air, suppress or filter out unwanted signals or noise and interference signals, and then obtain the original useful information after amplification and demodulation.

The transmitter 1006 is configured to generate and modulate the RF current and transmit the radio waves through the antenna.

In embodiments of the present disclosure, the transmitter 1006 and receiver 1004 may be implemented as a transceiver.

The terminal 60 illustrated in FIG. 7 and the terminal device 100 illustrated in FIG. 10 may implement each process implanted by the first terminal 12 in the abovementioned method embodiments and will not be elaborated herein to avoid repetitions.

Figure 8:
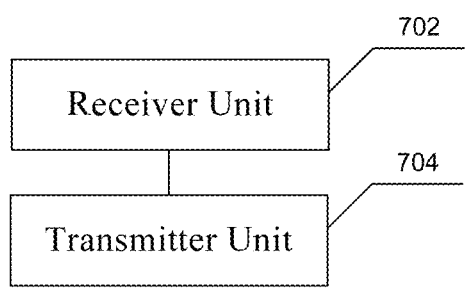
FIG. 8 schematically illustrates a terminal according to another embodiment of the present disclosure.

FIG. 8 schematically illustrates a terminal according to another embodiment of the present disclosure. The terminal may be the second terminal 13 in FIG. 2.

Referring to FIG. 8, the terminal 70 comprises: a receiver unit 702.

The receiver unit 702 is configured to receive a second DCI from a network device (e.g. the network device 11 in FIG. 2), wherein the second DCI is configured to transport scheduling information of a sidelink between a first terminal (e.g. the first terminal 12 in FIG. 2) and the terminal 70 and may comprise: frequency domain resource assignment, time domain resource assignment and modulation and coding scheme.

The receiver unit 702 is further configured to receive sidelink data from the first terminal on a resource scheduled by the scheduling information. For example, the resource is determined according to the frequency domain resource assignment and the time domain resource assignment.

The resource is obtained by the first terminal by receiving a first DCI from the network device and used by the first terminal for transmitting the sidelink data.

The first DCI may comprise: the frequency domain resource assignment, the time domain resource assignment and the modulation and coding scheme.

In embodiments of the present disclosure, the first DCI and the second DCI further comprises: redundancy version and HARQ process number; for the first DCI, the redundancy version is configured to indicate the redundancy version of the sidelink data for the first terminal transmission and the HARQ process number is configured to indicate the HARQ process number of the sidelink data for the first terminal transmission; for the second DCI, the redundancy version is configured to indicate the redundancy version of the sidelink data for the terminal 70 reception and the HARQ process number is configured to indicate the HARQ process number of the sidelink data for the terminal 70 reception.

In embodiments of the present disclosure, the first DCI and the second DCI further comprises: PUCCH resource indicator; for the first DCI, the PUCCH resource indicator is configured to indicate first PUCCH resource for transmitting a first UCI corresponding to the sidelink data to the network device by the first terminal; for the second DCI, the PUCCH resource indicator is configured to indicate second PUCCH resource for transmitting second UCI corresponding to the sidelink data to the network device by the terminal 70.

In embodiments of the present disclosure, wherein the second UCI comprises at least one of HARQ-ACK/NACK for the received sidelink data, the sidelink channel state information report.

In embodiments of the present disclosure, the second PUCCH resource is based on PUCCH resource set configured for the terminal 70.

In embodiments of the present disclosure, the first DCI and the second DCI further comprises: frequency hopping flag and frequency hopping parameters/configurations; the frequency hopping flag is configured to indicate to the first terminal and the terminal 70 whether the first terminal shall perform PSSCH frequency hopping or not, and the frequency hopping parameters/configurations are configured to indicate to the first terminal and the terminal 70 the frequency hopping parameters/configurations for the sidelink data if the frequency hopping flag indicates that the first terminal shall perform PSSCH frequency hopping.

In embodiments of the present disclosure, the first DCI and the second DCI further comprises at least one of carrier indicator, sidelink MIMO transmission parameters/configurations or identifier for DCI; for first DCI, the carrier indicator is configured to indicate a component carrier index of the first terminal; and for the second DCI, the carrier indicator is configured to indicate a component carrier index of the terminal 70; the sidelink MIMO transmission parameters/configurations are configured to indicate to the first terminal and the terminal 70 the sidelink MIMO transmission parameters/configurations for the sidelink data; and the identifier for DCI is configured to indicate to the first terminal and the terminal 70 the received DCI is the first DCI or the second DCI.

In embodiments of the present disclosure, the second DCI further comprises at least one of SRS resource indicator, HARQ timing indicator or group destination ID; the SRS resource indicator is configured to indicate to the terminal 70 resource for transmitting SRS to the first terminal, the HARQ timing indicator is configured to indicate to the terminal 70 the timing for transmitting HARQ-ACK/NACK for the received sidelink data, and the group destination ID is configured to indicate to the terminal 70 the group destination ID for the sidelink data.

In embodiments of the present disclosure, the terminal 70 further comprises: a transmitter unit 704, wherein the transmitter unit 704 is configured to transmit the HARQ-ACK/NACK for the received sidelink data to the network device based on the timing.

It is important to note that, in the embodiment of the disclosure, the receiver unit 702 may be implemented by a receiver (e.g. the receiver 1104 in FIG. 10) and the transmitter unit 704 may be implemented by a transmitter (e.g. the transmitter 1106).

Figure 11:
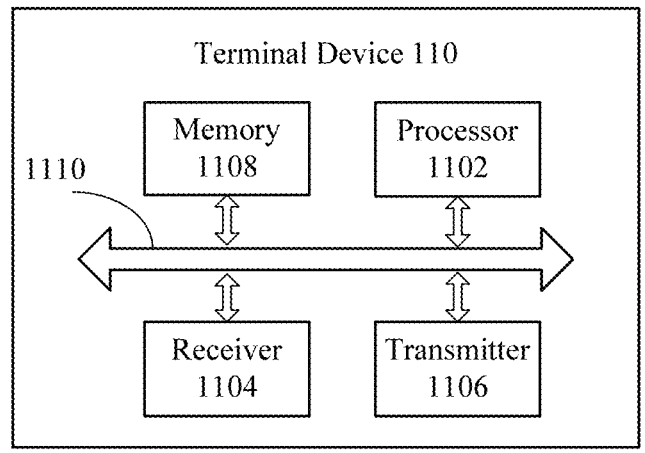
FIG. 11 schematically illustrates a terminal device according to another embodiment of the present disclosure.

FIG. 11 schematically illustrates a terminal device according to another embodiment of the present disclosure.

As illustrated in FIG. 11, a terminal device 110 may include a processor 1102, a receiver 1104, a transmitter 1106 and a memory 1108, wherein the memory 1108 may be configured to store a code executed by the processor 1102 an the like.

Each component in the terminal device 110 is coupled together through a bus system 1110, wherein the bus system 1110 includes a data bus, and further includes a power bus, a control bus and a state signal bus.

The processor 1102 typically controls overall operations of the terminal device 110, such as the operations associated with display, data communications and recording operations. The processor 1102 may include one or more processors to execute instructions to perform all or part of the steps in the above described methods. Moreover, the processor 1002 may include one or more modules which facilitate the interaction between the processor 1102 and other components.

The memory 1108 is configured to store various types of data to support the operation of the terminal device 110. Examples of such data include instructions for any applications or methods operated on the terminal device 110, contact data, phonebook data, messages, pictures, video, etc. The memory 1108 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory or a magnetic or optical disk.

The receiver 1104 is configured to receive an electromagnetic signal received by the antenna. The main function of the receiver is to select the frequency components it needs from the numerous electromagnetic waves existing in the air, suppress or filter out unwanted signals or noise and interference signals, and then obtain the original useful information after amplification and demodulation.

The transmitter 1106 is configured to generate and modulate the RF current and transmit the radio waves through the antenna.

In embodiments of the present disclosure, the transmitter 1106 and receiver 1104 may be implemented as a transceiver.

The terminal 70 illustrated in FIG. 8 and the terminal device 110 illustrated in FIG. 11 may implement each process implanted by the second terminal 13 in the above-mentioned method embodiments and will not be elaborated herein to avoid repetitions.

Figure 9:
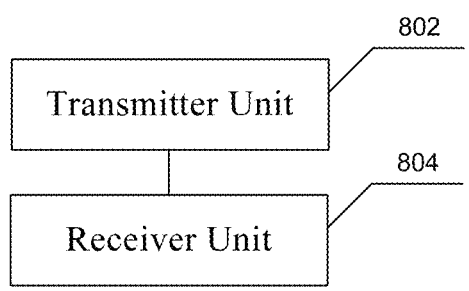
FIG. 9 schematically illustrates a network device according to an embodiment of the present disclosure.

FIG. 9 schematically illustrates a network device according to an embodiment of the present disclosure. The network device may be the network device 11 in FIG. 2.

Referring to FIG. 9, the network device 80 comprises: a transmitter unit 802.

The transmitter unit 802 is configured to transmit a first DCI to a first terminal (e.g. the first terminal 12 in FIG. 2), wherein the first DCI is configured to transport scheduling information of a sidelink between the first terminal and a second terminal (e.g. the second terminal 13 in FIG. 2).

The transmitter unit 802 is further configured to transmit a second DCI to a second terminal, wherein the second DCI is also configured to transport scheduling information of the sidelink between the first terminal and the second terminal.

A resource scheduled by the scheduling information is used by the first terminal for transmitting sidelink data and by the second terminal for receiving the sidelink data.

The first DCI and the second DCI may comprise: frequency domain resource assignment, time domain resource assignment and modulation and coding scheme; for the first DCI, the frequency domain resource assignment and the time domain resource assignment is configured to indicate time-frequency resource for the sidelink data transmission; and for the second DCI, the frequency domain resource assignment and the time domain resource assignment is configured to indicate the time-frequency resource for the sidelink data reception.

In embodiments of the present disclosure, the first DCI and the second DCI further comprises: redundancy version and HARQ process number; for the first DCI, the redundancy version is configured to indicate the redundancy version of the sidelink data for the first terminal transmission and the HARQ process number is configured to indicate the HARQ process number of the sidelink data for the first terminal transmission; for the second DCI, the redundancy version is configured to indicate the redundancy version of the sidelink data for the second terminal reception and the HARQ process number is configured to indicate the HARQ process number of the sidelink data for the second terminal reception.

In embodiments of the present disclosure, the first DCI and the second DCI further comprises: PUCCH resource indicator; for the first DCI, the PUCCH resource indicator is configured to indicate first PUCCH resource for transmitting a first UCI corresponding to the sidelink data to the network device 80 by the first terminal; for the second DCI, the PUCCH resource indicator is configured to indicate second PUCCH resource for transmitting second UCI corresponding to the sidelink data to the network device 80 by the second terminal.

In embodiments of the present disclosure, the first UCI comprises at least one of scheduling request, buffer status report, service type or QoS requirement.

In embodiments of the present disclosure, the second UCI comprises at least one of HARQ-ACK/NACK for the received sidelink data, the sidelink channel state information report.

In embodiments of the present disclosure, the first PUCCH resource is based on PUCCH resource set configured for the first terminal and the second PUCCH resource is based on PUCCH resource set configured for the second terminal.

In embodiments of the present disclosure, the first DCI and the second DCI further comprises: frequency hopping flag and frequency hopping parameters/configurations; the frequency hopping flag is configured to indicate to the first terminal and the second terminal whether the first terminal shall perform PSSCH frequency hopping or not, and the frequency hopping parameters/configurations are configured to indicate to the first terminal and the second terminal the frequency hopping parameters/configurations for the sidelink data if the frequency hopping flag indicates that the first terminal shall perform PSSCH frequency hopping.

In embodiments of the present disclosure, the first DCI and the second DCI further comprises at least one of carrier indicator, sidelink MIMO transmission parameters/configurations or identifier for DCI; for first DCI, the carrier indicator is configured to indicate a component carrier index of the first terminal; and for the second DCI, the carrier indicator is configured to indicate a component carrier index of the second terminal; the sidelink MIMO transmission parameters/configurations are configured to indicate to the first terminal and the second terminal the sidelink MIMO transmission parameters/configurations for the sidelink data; and the identifier for DCI is configured to indicate to the first terminal and the second terminal the received DCI is the first DCI or the second DCI.

In embodiments of the present disclosure, the first DCI further comprises at least one of TPC command, CSI-RS resource indicator or timing advance indication; the TPC command is configured to adjust transmission power of the sidelink data for the first terminal, the CSI-RS resource indicator is configured to indicate the first terminal resource for transmitting CSI-RS to the second terminal, and the timing advance indication is configured to indicate to the first terminal the timing advance for transmitting the sidelink data.

In embodiments of the present disclosure, the second DCI further comprises at least one of SRS resource indicator, HARQ timing indicator or group destination ID; the SRS resource indicator is configured to indicate to the second terminal resource for transmitting SRS to the first terminal, the HARQ timing indicator is configured to indicate to the second terminal the timing for transmitting HARQ-ACK/NACK for the received sidelink data, and the group destination ID is configured to indicate to the second terminal the group destination ID for the sidelink data.

In embodiments of the present disclosure, the network device 80 further comprises: a receiver unit 804, wherein the receiver unit 804 is configured to receive the HARQ-ACK/NACK for the received sidelink data from the second terminal.

It is important to note that, in the embodiment of the disclosure, the receiver unit 804 may be implemented by a receiver (e.g. the receiver 1204 in FIG. 10) and the transmitter unit 802 may be implemented by a transmitter (e.g. the transmitter 1206).

Figure 12:
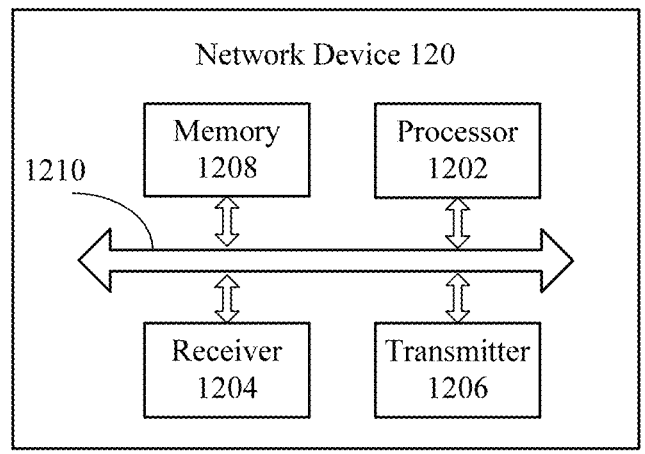
FIG. 12 schematically illustrates a network device according to another embodiment of the present disclosure.

FIG. 12 schematically illustrates a network device according to another embodiment of the present disclosure.

As illustrated in FIG. 12, a network device 120 may include a processor 1202, a receiver 1204, a transmitter 1206 and a memory 1208, wherein the memory 1208 may be configured to store a code executed by the processor 1202 an the like.

Each component in the network device 120 is coupled together through a bus system 1210, wherein the bus system 1210 includes a data bus, and further includes a power bus, a control bus and a state signal bus.

The processor 1202 typically controls overall operations of the terminal device 120, such as the operations associated with display, data communications and recording operations. The processor 1202 may include one or more processors to execute instructions to perform all or part of the steps in the above described methods. Moreover, the processor 1202 may include one or more modules which facilitate the interaction between the processor 1202 and other components.

The memory 1208 is configured to store various types of data to support the operation of the terminal device 120. Examples of such data include instructions for any applications or methods operated on the terminal device 120, contact data, phonebook data, messages, pictures, video, etc. The memory 1208 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory or a magnetic or optical disk.

The receiver 1204 is configured to receive an electromagnetic signal received by the antenna. The main function of the receiver is to select the frequency components it needs from the numerous electromagnetic waves existing in the air, suppress or filter out unwanted signals or noise and interference signals, and then obtain the original useful information after amplification and demodulation.

The transmitter 1206 is configured to generate and modulate the RF current and transmit the radio waves through the antenna.

In embodiments of the present disclosure, the transmitter 1206 and receiver 1204 may be implemented as a transceiver.

The network device 80 illustrated in FIG. 9 and the network device 120 illustrated in FIG. 12 may implement each process implanted by the network device 11 in the abovementioned method embodiments and will not be elaborated herein to avoid repetitions. Exemplary embodiments have been specifically shown and described as above. It will be appreciated by those skilled in the art that the disclosure is not limited the disclosed embodiments; rather, all suitable modifications and equivalent which come within the spirit and scope of the appended claims are intended to fall within the scope of the disclosure.

What is claimed is:

1. A terminal, comprising: a processor, a receiver and a transmitter,
wherein the processor is configured to receive, through the receiver, a first DCI from a network device, and the first DCI is configured to transport scheduling information of a sidelink between the terminal and a second terminal;
the processor is further configured to transmit, through the transmitter, sidelink data to the second terminal on a resource scheduled by the scheduling information; and
the resource is obtained by the second terminal by receiving a second DCI from the network device and used by the second terminal for receiving the sidelink data,
wherein the first DCI and the second DCI comprises: frequency domain resource assignment and/or time domain resource assignment and the resource is determined according to the frequency domain resource assignment and/or the time domain resource assignment; and
wherein the first DCI and the second DCI further comprises: redundancy version and HARQ process number; for the first DCI, the redundancy version is configured to indicate the redundancy version of the sidelink data for the terminal transmission and the HARQ process number is configured to indicate the HARQ process number of the sidelink data for the terminal transmission; for the second DCI, the redundancy version is configured to indicate the redundancy version of the sidelink data for the second terminal reception and the HARQ process number is configured to indicate the HARQ process number of the sidelink data for the second terminal reception.

2. The terminal according to claim 1, wherein the first DCI and the second DCI further comprises: modulation and coding scheme, configured to indicate the modulation and coding scheme for the sidelink transmission and reception.

3. The terminal according to claim 1, wherein the first DCI and the second DCI further comprises: PUCCH resource indicator; for the first DCI, the PUCCH resource indicator is configured to indicate first PUCCH resource for transmitting a first UCI corresponding to the sidelink data to the network device by the terminal; for the second DCI, the PUCCH resource indicator is configured to indicate second PUCCH resource for transmitting second UCI corresponding to the sidelink data to the network device by the second terminal.

4. The terminal according to claim 3, wherein the first UCI comprises at least one of scheduling request, buffer status report, service type or QoS requirement; or
wherein the first PUCCH resource is based on PUCCH resource set configured for the terminal.

5. The terminal according to claim 1, wherein the first DCI and the second DCI further comprises: frequency hopping flag; the frequency hopping flag is configured to indicate to the terminal and the second terminal whether the terminal shall perform PSSCH frequency hopping or not.

6. The terminal according to claim 5, wherein the first DCI and the second DCI further comprises: frequency hopping parameters/configurations, configured to indicate to the first terminal and the second terminal the frequency hopping parameters/configurations for the sidelink data if the frequency hopping flag indicates that the first terminal shall perform PSSCH frequency hopping.

7. The terminal according to claim 1, wherein the first DCI and the second DCI further comprises at least one of carrier indicator, sidelink MIMO transmission parameters/configurations or identifier for DCI; for first DCI, the carrier indicator is configured to indicate a component carrier index of the terminal; and for the second DCI, the carrier indicator is configured to indicate a component carrier index of the second terminal; the sidelink MIMO transmission parameters/configurations are configured to indicate to the terminal and the second terminal the sidelink MIMO transmission parameters/configurations for the sidelink data; and the identifier for DCI is configured to indicate to the terminal and the second terminal the received DCI is the first DCI or the second DCI.

8. The terminal according to claim 1, wherein the first DCI further comprises at least one of TPC command, CSI-RS resource indicator or timing advance indication; the TPC command is configured to adjust transmission power of the sidelink data for the terminal, the CSI-RS resource indicator is configured to indicate the terminal resource for transmitting CSI-RS to the second terminal, and the timing advance indication is configured to indicate to the terminal the timing advance for transmitting the sidelink data.

9. A terminal, comprising: a receiver unit,
wherein the receiver unit is configured to receive a second DCI from a network device, and the second DCI is configured to transport scheduling information of a sidelink between a first terminal and the terminal;
the receiver unit is further configured to receive sidelink data from the first terminal on a resource scheduled by the scheduling information; and the resource is obtained by the first terminal by receiving a first DCI from the network device and used by the first terminal for transmitting the sidelink data, wherein the first DCI and the second DCI comprises: frequency domain resource assignment and/or time domain resource assignment and the resource is determined according to the frequency domain resource assignment and/or the time domain resource assignment; and wherein the first DCI and the second DCI further comprises: redundancy version and HARQ process number; for the first DCI, the redundancy version is configured to indicate the redundancy version of the sidelink data for the first terminal transmission and the HARQ process number is configured to indicate the HARQ process number of the sidelink data for the first terminal transmission; for the second DCI, the redundancy version is configured to indicate the redundancy version of the sidelink data for the terminal reception and the HARQ process number is configured to indicate the HARQ process number of the sidelink data for the terminal reception.

10. The terminal according to claim 9, wherein the first DCI and the second DCI further comprises: modulation and coding scheme, configured to indicate the modulation and coding scheme for the sidelink transmission and reception.

11. The terminal according to claim 9, wherein the first DCI and the second DCI further comprises: PUCCH resource indicator; for the first DCI, the PUCCH resource indicator is configured to indicate first PUCCH resource for transmitting a first UCI corresponding to the sidelink data to the network device by the first terminal; for the second DCI, the PUCCH resource indicator is configured to indicate second PUCCH resource for transmitting second UCI corresponding to the sidelink data to the network device by the terminal.

12. The terminal according to claim 9, wherein the first DCI and the second DCI further comprises: frequency hopping flag; the frequency hopping flag is configured to indicate to the first terminal and the terminal whether the first terminal shall perform PSSCH frequency hopping or not.

13. The terminal according to claim 12, wherein the first DCI and the second DCI further comprises: frequency hopping parameters/configurations, configured to indicate to the first terminal and the second terminal the frequency hopping parameters/configurations for the sidelink data if the frequency hopping flag indicates that the first terminal shall perform PSSCH frequency hopping.

14. The terminal according to claim 9, wherein the first DCI and the second DCI further comprises at least one of carrier indicator, sidelink MIMO transmission parameters/configurations or identifier for DCI; for first DCI, the carrier indicator is configured to indicate a component carrier index of the first terminal; and for the second DCI, the carrier indicator is configured to indicate a component carrier index of the terminal; the sidelink MIMO transmission parameters/configurations are configured to indicate to the first terminal and the terminal the sidelink MIMO transmission parameters/configurations for the sidelink data; and the identifier for DCI is configured to indicate to the first terminal and the terminal the received DCI is the first DCI or the second DCI.

15. The terminal according to claim 9, wherein the second DCI further comprises at least one of SRS resource indicator, HARQ timing indicator or group destination ID; the SRS resource indicator is configured to indicate to the terminal resource for transmitting SRS to the first terminal, the HARQ timing indicator is configured to indicate to the terminal the timing for transmitting HARQ-ACK/NACK for the received sidelink data, and the group destination ID is configured to indicate to the terminal the group destination ID for the sidelink data.

16. The terminal according to claim 15, further comprising: a transmitter unit, wherein the transmitter unit is configured to transmit the HARQ-ACK/NACK for the received sidelink data to the network device based on the timing.

* * * * *